United States Patent [19]

Lacour

[11] Patent Number: 4,876,471
[45] Date of Patent: Oct. 24, 1989

[54] MAGNETIC DRIVE COUPLER WITH CONSTANT TORQUE INDEPENDENT OF OUTPUT SLIPPAGE

[75] Inventor: Gilles Lacour, Belley, France
[73] Assignee: L'Enrouleur Electrique Moderne, Belley, France
[21] Appl. No.: 124,504
[22] Filed: Nov. 24, 1987
[30] Foreign Application Priority Data
  Nov. 25, 1986 [FR] France ............................ 86 16947
[51] Int. Cl.⁴ ............................................. H02K 49/04
[52] U.S. Cl. ...................................... 310/105; 310/43; 310/46; 310/156
[58] Field of Search ................ 310/44, 46, 103, 104, 310/105, 43, 45, 266, 78, 102 R, 156

[56] References Cited
U.S. PATENT DOCUMENTS

| | | | |
|---|---|---|---|
| 4,502,982 | 3/1985 | Horie et al. | 252/62.54 |
| 4,553,056 | 11/1985 | Pfister | 310/105 |
| 4,558,077 | 12/1985 | Gray | 252/62.54 |
| 4,601,753 | 7/1986 | Soileau et al. | 252/62.54 |
| 4,696,725 | 9/1987 | Ochiai et al. | 252/62.54 |

FOREIGN PATENT DOCUMENTS 1602519 1/1971 France .
266799 3/1927 United Kingdom .

Primary Examiner—Peter S. Wong
Assistant Examiner—D. L. Rebsch
Attorney, Agent, or Firm—Dennison, Meserole, Pollack & Scheiner

[57] ABSTRACT

A magnetic coupler employing hysteresis for coupling a driving motor to a winding and reeling machine to produce a constant torque independent of any slippage between the input and output of the coupler. The coupler includes a driving disc molded of magnetic particles in an insulating binder interfaced with a driven disc formed of a radial array of permanent magnets.

17 Claims, 3 Drawing Sheets

MAGNETIC DRIVE COUPLER WITH CONSTANT TORQUE INDEPENDENT OF OUTPUT SLIPPAGE

BACKGROUND OF THE INVENTION

The invention concerns magnetic couplings employing magnetic hysteresis and the use of such couplings or couplers as a slip-clutch in a power train in winding and unwinding mechanisms.

French Patent No. FR-1 602 519 describes a winding and unwinding mechanism using such couplers. Each coupler has two coaxial elements adapted to rotate relative to one another. One of these elements contains an inductor which develops an alternating multipolar magnetic field with its poles succeeding one another by symmetry of revolution about the axis of revolution. The other element is of ferromagnetic, preferably magnetically hard material which has not previously been magnetized. The inductor has electromagnets, or preferably permanent magnets. During the winding or unwinding process, the drive motor may be kept at normal speed, though the possibility for slipping exists at the receiving elements or followers relative to the drive or load elements. According to this document, the torque transmitted then remains virtually constant. However, experience has shown that at high slipping speeds, and particularly in the unwinding process, the torque transmitted increased greatly and in a troublesome way with the slipping speed. For example, the increase might be more than a relative +60% for slipping speeds of over 2000 revolutions per minute, in the case of winding and unwinding couplers.

Old British Patent No. GB-A-266 799 (1927) describes in particular electric motors with an induced element which is electrically non-conductive or hardly conductive. It is made of magnetic materials in divided form, possibly mixed with a non-conductive binder, leading to the virtual absence of Foucault currents. These armatures and motors are simple and inexpensive.

Applicants have attempted to perfect a magnetic coupler giving a transmitted torque which is almost or completely independent of the slipping speed.

DESCRIPTION OF THE INVENTION

The subject of the invention is a magnetic coupler employing hysteresis which, in a manner known from GB-A-266 799, has an inductive sub-unit and an induced sub-unit comprising particles of magnets mixed with an electrically insulating binder. According to the invention, the particles of magnetic together with the binder form a molded compound in which the particles are dispersed. The binder takes up 25 to 60% of the volume of the compound, and the compound is in a heat conducting relationship with a cooling element.

The inductive sub-unit has permanent magnets or electromagnets. The coupler's inductive coupling between the inductor and the armature is applied whether the inductor is acting as the leading member, i.e. is driven mechanically, or as the follower. Prior art teaching does not resolve the problem posed, namely of perfecting a magnetic coupling giving a transmitted torque substantially independent of the slipping speed, particularly for high slipping speeds, of over 1000 revolutions per minute and typically from 1000 to 3000 revolutions per minute.

The solution to the problem of the invention is a combination of the following means:

(a) The induced sub-unit comprises a composite molded compound forming the active part of the armature, a feature known per se from GB-A-266,799. The term "armature" or "hysteresis plate" will be used in this specification to describe the induced elements formed by granular magnetic materials molded into plates to coact with the permanent magnets to form the magnetic coupler. The compound is typically made up of fragmented or powdered ferromagnetic magnets, e.g. of the A1-Ni-Co or Fe-Nd-B type, bonded by an electrical insulator, such as a resin. In addition, the proportion by volume of binder must be within a range suitable for the possible embodiments, length of life and efficiency of the coupler according to the invention. At least 25% by volume of binder is required to allow for easy working of the pieces or particles of magnets in the molded compound and satisfactory filling in the molding process, while at the same time obtaining an electrically non-conductive compound, i.e. compound where the particles are sufficiently insulated from one another, at least in the aggregate. It has been found that normal dispersion of the particles of magnet in the binder, corresponding to medium grade working, was then sufficient, since a comparative test with previous oxidation of the magnetic particles did not bring any substantial improvement in the action of the coupler for slipping speeds of up to 2000 revolutions per minute. When the proportion of binder is greatly increased, the couple transmitted per unit area of armature decreased excessively, and in practice, the proportion of binder must not exceed 60% by volume. The tests carried out showed that the electrically insulating binder must preferably take up 30 to 40% of the volume of the molded composite compound in view of the three required factors (ease of mixing and molding, adequate insulation of the magnetic particles from one another, and little change in the torque transmitted with the slipping speed).

(b) At high slipping speeds, the hysteresis cycles follow in rapid succession and cause considerable heating in the composite armature. If no cooling steps were taken, this would lead to disintegration of the molded compound. The compound, therefore, has to be in a heat conductive relationship with a cooling element.

Owing to the nature of the composite compound, the operating temperature of the induced elements is lower in the slip process than the temperature of solid induced elements. Dispersion of the material with hysteresis reduces the density of heating due to magnetic losses by hysteresis, and heating due to Foucault currents is virtually eliminated. However, residual heating must be further reduced, since the binder employed has limited resistance to overheating. So the molded paste is typically fixed on a support acting as a heat diffuser, with over 40% of its surface in contact with the support. The binder may, for example, be a thermosetting resin, and the composite compound may cover the concave portion of an aluminum or alloy support located opposite the inductor. 55 to 60% of the surface of the compound is then in good heat contact with the support, and the dissipation of heat by the support fitted with cooling fins is such that, in operation, the temperature of the compound is always below 100° C., whereas without cooling, it would be over 160° C., leading to fairly rapid disintegration of the binder.

Whatever the proportion of electrically insulating binder, it is desirable for the sizes of the magnetic particles to be limited relative to the dimension of the poles of the inductor. In practice, the dimensions of each particle are therefore less than ⅓ of the width of the poles, since otherwise Foucault currents may have a considerable effect again. Nor is it desirable for the magnetic particles to be too small, since this would mean loss of efficiency in transmitting the couple. Hence, 75% by weight or volume of the particles have dimensions of at least 0.2 mm, and preferably from 0.3 to 0.8 mm.

As a means of further reducing residual heat in the compound of the armature, the binder preferably comprises electrically insulating particles embedded in a resin. The particles are further more heat conductive than the resin. One can thus have 40 to 80% by volume of fine particles of glass, alumina or ceramics embedded in the resin, their average dimensions being typically from 5 to 30 microns. In making the induced sub-unit, it is particularly convenient to use an epoxy resin as the binder or as a component of a binder filled with such particles.

The induced sub-unit of the coupler according to the invention may equally consist at least partly of a wire or band of a material which is magnetizable and sheathed with an electric insulator, as is known per se from GB-A-No. 266,799. The induced sub-unit may then consist at least partly of a winding of that wire or band, typically in spiral or cylindrical form, with the electrical insulator thereof taking up 25 to 40% of the volume.

As far as the armature support is concerned, it has been found, surprisingly, that a plastic support with cooling fins makes the torque transmitted to the armature completely independent of the relative rotary speed of the inductor. More generally, it is preferable to make the armature support of a material which is non-magnetic and only slightly electrically conductive, as a means of further diminishing or eliminating variations in the torque with the slip speed. Thus, when a plastic support is used, it may be filled with mechanically reinforcing elements, such as glass fibers, which give a particularly simple and effective solution to the problem posed. From the surprising results observed with a plastic support, one can conclude that there are still some Foucault currents with an electrically conductive support, such as aluminum, and that these residual currents are then eliminated or greatly reduced with a support which is electrically non-conductive or only slightly conductive. At the same time, it has been found that, although the cooling effect with a plastic support is relatively poor, it is sufficient in this case, probably because the support material chosen causes the residual Foucault currents, which are sources of heating, to diminish or disappear.

The second object of the invention is to use the coupler with the composite induced element, in any of the forms described above, in a winding and unwinding mechanism. In such an arrangement, the regularity of the torque transmitted and limitation of the heating of the coupler or couplers are important for safe operation.

DETAILED DESCRIPTION OF THE INVENTION

Figure 1:
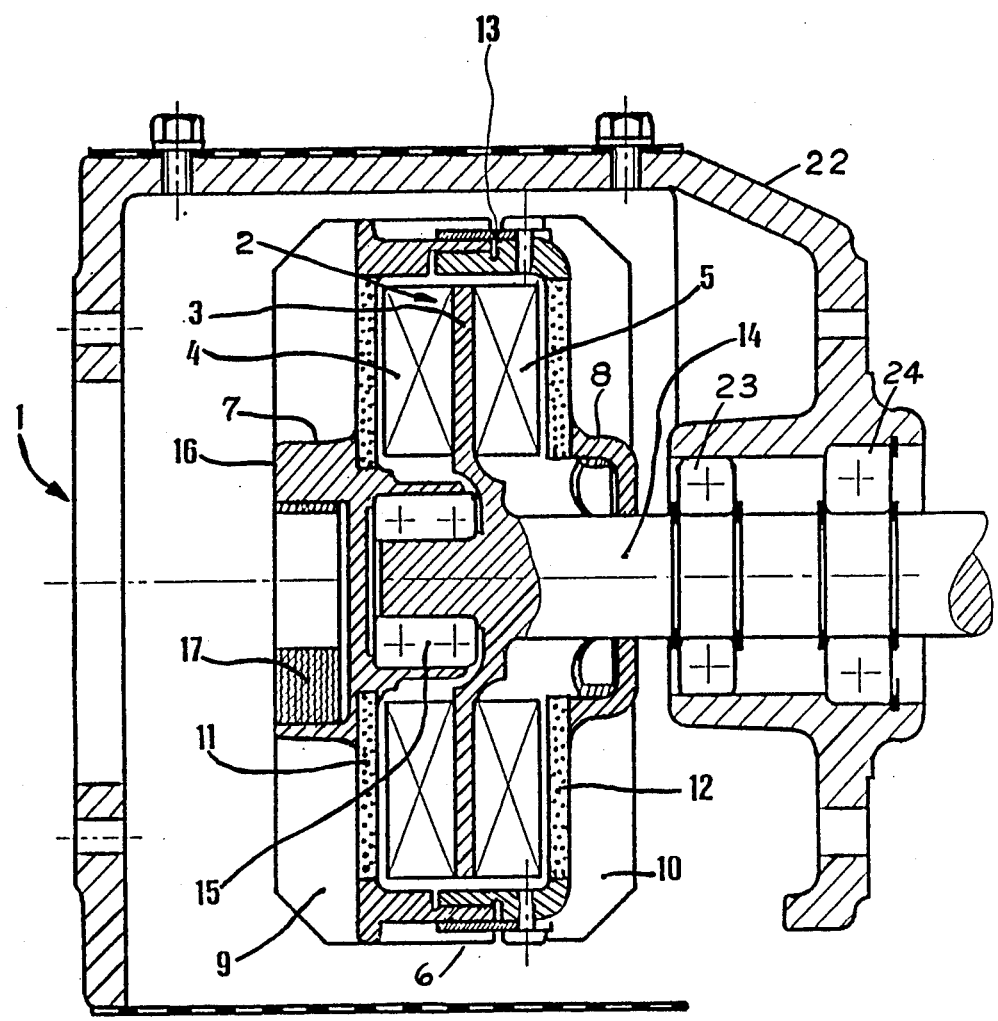
FIG. 1 is a longitudinal axial section through a magnetic hysteresis coupler according to the invention.
Figure 2:
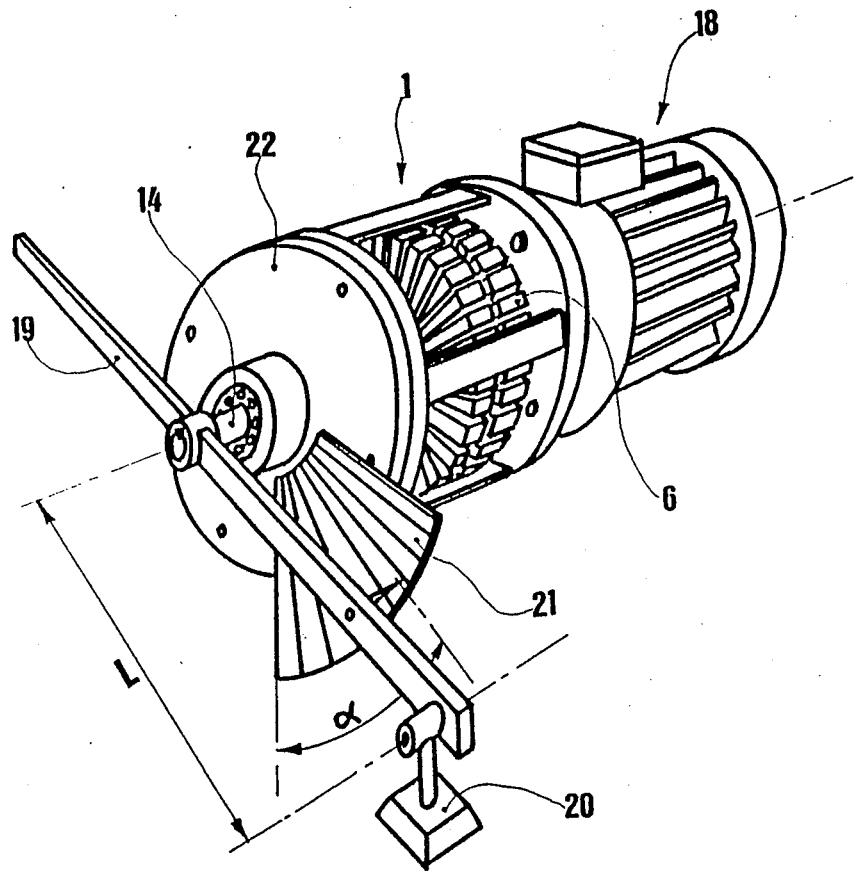
FIG. 2 is a perspective view of the comparative testing equipment.

FIG. 1 shows a sectional view of the coupler for connecting a drive motor, such as shown at 18 in FIG. 2, for driving an output shaft 14 which is connected to a winding and reeling mechanism, not shown. Drive shaft 14 is mounted for rotation in housing 22 by means of bearings 23, 24. A plate 3 is formed on shaft 14, and attached to opposite sides of the plate are permanent magnets 4 and 5. Permanent magnets 4, 5, mounted on plate 3, collectively constitute an inductive subunit 2.

A roller bearing 15 is mounted on an end portion of shaft 14 for rotatably supporting a hollow casing formed of two cup-shaped support sections 7 and 8 medially joined by connections 13. Cup-shaped member 7 is firmly mounted on bearing 15 and carries cup-shaped member 8 by means of connections 13 to rotate around shaft 14 under slip conditions. Cup-shaped sections 7 and 8 carry aluminum support structures 9 and 10 for added strength and to radiate heat energy caused by electrical losses and hysteresis.

An armature 11, formed of a slab of molded magnetic compound, is fixedly mounted on the bottom of cup-shaped member 7 to lie in opposed relationship with permanent magnets 4. A similar armature 12 is mounted in cup-shaped member 8 to lie in opposed relationship with permanent magnets 5. The outer end of cup-shaped member 7 is provided with driving fingers 16 which receive meshing resilient fingers 17 of a conventional drive coupling for driving the cup-shaped members 7 and 8 from an externally mounted motor.

Armatures 11 and 12 supported by cup-shaped members 7 and 8 and support structures 9 and 10 collectively constitute an induced sub-unit 6. As the sub-unit 6 is driven by drive fingers 16, 17, the induced sub-unit 6 will magnetically couple with the permanent magnets 4 and 5 of inductive sub-unit 2 forming a hysteresis drive as explained in the above-mentioned British patent.

Depending upon conditions in the winding and reeling mechanism, shaft 14 will experience various degrees of slip with respect to drive 16, 17, and sub-unit 2. However, because of the construction of armature 11, 12, the torque generated by shaft 14 will always be substantially constant. This latter feature is important in winding and reeling machinery.

Armatures 11 and 12 are made up of 30% by volume of epoxy resin filled with alumina spheres 9 microns in diameter, and 70% of Al-Ni-Co powder of the following percentage composition by weight: Ni 25, Al 12, Co 5, Cu 4, Fe - the remainder. The two induced plates of magnetic compound each have the following dimensions: outside diameter 170 mm - inside diameter 90 mm - thickness 3 mm.

Figure 3:
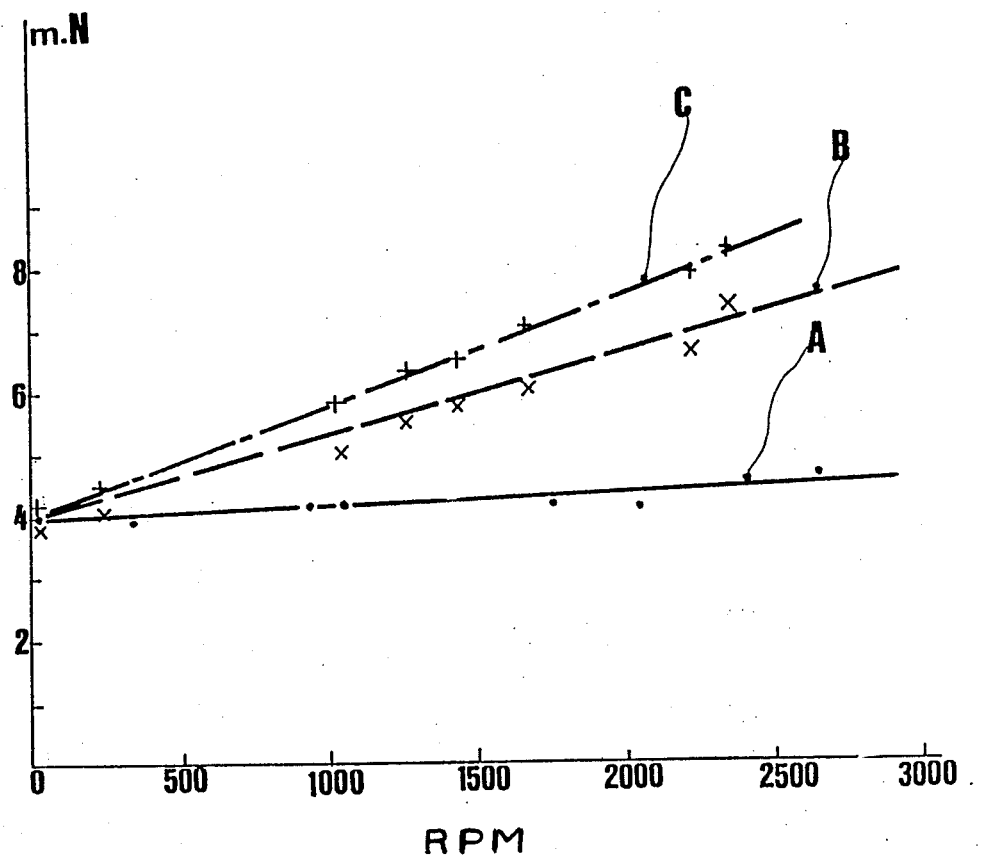
FIG. 3 shows the variation in the torque transmitted as a function of the speed, for a coupler according to the invention and a prior art one.

The results of the tests in FIG. 2 are contained in FIG. 3 and the tests were carried out under the following conditions: the measuring device consisted of a motor 18 fixed to the induced sub-unit 6, shown in FIG. 1, which formed the primary of the coupler 1, by a collar and the flexible coupling 16 and 17 (FIG. 1). An arm 19 was fixed rigidly to the end of the output shaft 14 and normal to it, and a 2 kg weight was suspended from the shaft a distance of L=0.5 m away from the shaft 14. A dial 21, graduated in degrees of an angle, was fixed to the end face 22 of the housing of the coupler 1, normal to the shaft 14.

The primary of the coupler 1 was driven at a variable speed ranging from 0 to 4000 revs per minute by the motor 18. The arm 19, fixed on the shaft 14 and carrying the weight 20, then served to apply a resisting torque which varied with the angular position. In the equilibrium position, with the rigid arm 19 immobile, the torque transmitted is equal to the resisting torque, which can be arrived at quickly and easily by measuring the angle by which the arm 19 deviates from the descending vertical.

The accuracy of the system in estimating the torque transmitted was better than 3%. The inductors 4 and 5 were pieces of ferrite 19 mm thick with 16 poles in a trapezoidal arrangement 40 mm high with base lengths of 33 and 17.5 mm.

The results below were obtained with the coupler according to the invention:

TABLE 1

| Inductor speed (revs/minute) | 16 | 340 | 950 | 1050 | 1750 | 2050 | 2650 |
|---|---|---|---|---|---|---|---|
| Couple transmitted (m.N.) | 4.0 | 3.9 | 4.1 | 4.2 | 4.2 | 4.1 | 4.6 |

These results are repeated in FIG. 3 (Curve A), which shows the couple transmitted as a function of the relative rotating speed or sliding speed. In the case of this first coupler, the couple transmitted increased about 7.5% at the 2000 revs/minute level.

A similar coupler was tested in order to compare these results with those for a solid armature one. The coupler has the same inductor and one solid induced plate made of A1-Ni-Co of the same composition as the previous powder, with the following dimensions: outside diameter 143 mm, inside diameter 70 mm, thickness 8 mm, and only 8 poles, the increase in the couple transmitted with the relative rotating speed then being less than with 16 poles. The results of these tests are given in Table 2 and repeated in FIG. 3 (Curve B). The results for two induced plates identical with the preceding one, in the same position as plates 11 and 12 in FIG. 1, were calculated by extrapolation for purposes of comparison (Table 2 and Curve C in FIG. 3). The results for the coupler of the invention must be compared with these results for two solid induced plates, for the areas of magnetic material on the induced plates, which are here the most important parameters with respect to Foucault currents, are as follows:

coupler according to invention: $163.3 \times 2 \times 0.7 = 229$ cm$^2$ coupler with one solid induced plate: 122 cm$^2$ coupler with two solid induced plates: 244 cm$^2$

TABLE 2

| Speed (revs/minute) | | 30 | 230 | 1030 | 1280 | 1420 | 1680 | 2220 | 2350 |
|---|---|---|---|---|---|---|---|---|---|
| Torque (m.N) | 1 induced plate | 3.9 | 4.0 | 5.0 | 5.5 | 5.7 | 6.0 | 6.6 | 6.7 |
| | 2 induced plates (calculated) | 4.0 | 4.4 | 5.8 | 6.3 | 6.5 | 7.0 | 7.9 | 8.2 |

The results of comparing the composite armature coupler according to the invention with the coupler with two solid induced plates are as follows:

TABLE 3

Increase in torque transmitted with relative rotating speed

| Revs/minute | 1000 | 1500 | 2000 | 2500 |
|---|---|---|---|---|
| Coupler with composite armature | +5% | +6% | +7.5% | +11% |
| Coupler with solid armature | +45% | +65% | +85% | +112% |

TABLE 3-continued

Increase in torque transmitted with relative rotating speed

The effect of the invention thus becomes very marked when the relative rotating speed or slipping speed of the armature relative to the inductor exceeds 2000 revs/minute.

In another embodiment, the supports 9 and 10 of the induced plates 11 and 12 were made of thermosetting plastic filled with glass fibers, which were suitable for mass production molding. The corresponding tests were successively carried out with: a coupler comprising two inductors with 16 poles each, giving a couple of 0.45 m×kg, and a coupler comprising 2 inductors with 14 poles each, giving a couple of 0.6 m×kg. The couple transmitted for various rotary speeds up to 2500 revs/minute, as before, remained constant at better than 1 to 2%, since no variation could be detected with the measuring system previously described.

To summarize, the tests first show that a composite armature according to the invention greatly diminishes dependence of the torque transmitted to the armature on the relative rotary speed of the inductor. Secondly, they show the importance of the type of element for cooling the molded compound, since non-dependence of the torque transmitted on the rotary speed is surprisingly obtained with a cooling element of non-magnetic and electrically insulating plastic, thus eliminating any effect of Foucault currents. A couple of this type can operate for long periods with limited heating and at high slipping speeds.

I claim:

1. A magnetic coupler for transferring rotary power between a drive and a load with substantially constant torque independent of load slippage comprising; an inductive sub-unit (2) having a plurality of poles (4,5), an induced sub-unit (6) having one or more hysteresis plates (11,12), said poles and plates being mounted in confrontational relationship for relative rotary motion with respect to each other, said one or more plates being at least partly made of a molded compound containing magnetic particles embedded therein, said particles having a maximum dimension less than ⅓ of the width of said poles, said particles being dispersed in 25 to 60% by volume of an electrically insulated binder, said hysteresis plates being in a heat conductive relationship with cooling elements (9,10) attached to the induced sub-unit.

2. The coupler of claim 1, wherein the molded compound (11, 12) of the hysteresis plates contains 30 to 40% by volume of electrically insulating binder.

3. The coupler of claim 1 wherein at least 75% by weight or volume of said magnetic particles have dimensions at least equal to 0.2 mm and preferably from 0.3 to 0.8 mm.

4. The coupler of claim 1 wherein the binder is made of electrically insulating particles embedded in a resin, the particles further having better heat conducting properties than the resin.

5. The coupler of claim 4, wherein the binder contains 40 to 80% by volume of particles of materials from the group: glass, alumina and ceramics.

6. The coupler of claim 1 wherein the cooling element is a support (9, 10) for the molded compound (11, 12) of non-magnetic, electrically poorly conducting material, the support (9, 10) being fitted with cooling fins.

7. The coupler of claim 6, wherein the support (9, 10) is made of plastic material.

8. The coupler of claim 7, wherein the plastic material is filled with mechanically reinforcing elements.

9. The use of a coupler according to claim 1 in a winding and unwinding mechanism, wherein the inductive sub-unit is formed of permanent magnets and the induced sub-unit is driven mechanically.

10. A magnetic coupler for transferring rotary power between a drive and a load with substantially constant torque independent of load slippage comprising: an inductive sub-unit (2) having a plurality of poles (4,5), an induced sub-unit (6) having one or more hysteresis plates (11,12), said poles and plates being mounted in confrontational relationship for relative rotary motion with respect to each other, said one or more plates being at least partly made of a molded compound containing magnetic particles embedded therein, said particles being dispersed in 25 to 60% by volume of an electrically insulated binder, said hysteresis plates being in a heat conductive relationship with cooling elements (9,10) attached to the induced sub-unit.

11. The coupler of claim 10, wherein the molded compound (11, 12) of the hysteresis plates contains 30 to 40% by volume of electrically insulating binder.

12. The coupler of claim 10, wherein the binder is made of electrically insulating particles embedded in a resin, the particles further having better heat conducting properties than the resin.

13. The coupler of claim 13, wherein the binder contains 40 to 80% by volume of particles of materials from the group: glass, alumina and ceramics.

14. The coupler of claim 10, wherein the cooling element is a support (9, 10) for the molded compound (11, 12) of non-magnetic, electrically poorly conducting material, the support (9, 10) being fitted with cooling fins.

15. The coupler of claim 10, wherein the support (9, 10) is made of plastic material.

16. The coupler of claim 15, wherein the plastic material is filled with mechanically reinforcing elements.

17. The use of a coupler according to claim 10 in a winding and unwinding mechanism, wherein the inductive sub-unit is formed of permanent magnets and the induced sub-unit is driven mechanically.

* * * * *